Sept. 23, 1958 W. NEIDMANN 2,853,324
MEANS FOR CONNECTING TUBES, FOR INSTANCE SCAFFOLDING TUBES
Filed Dec. 8, 1955
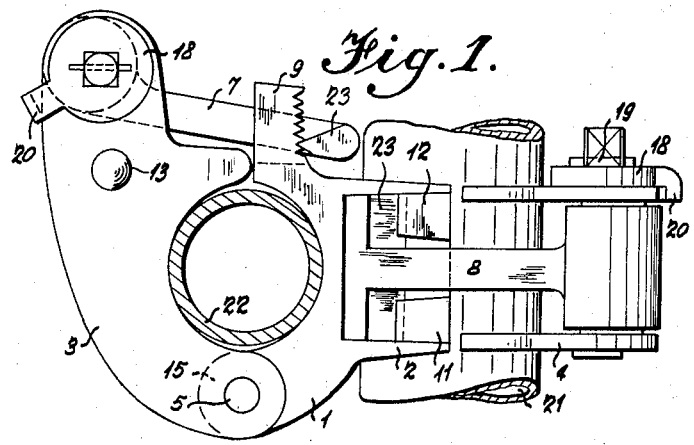
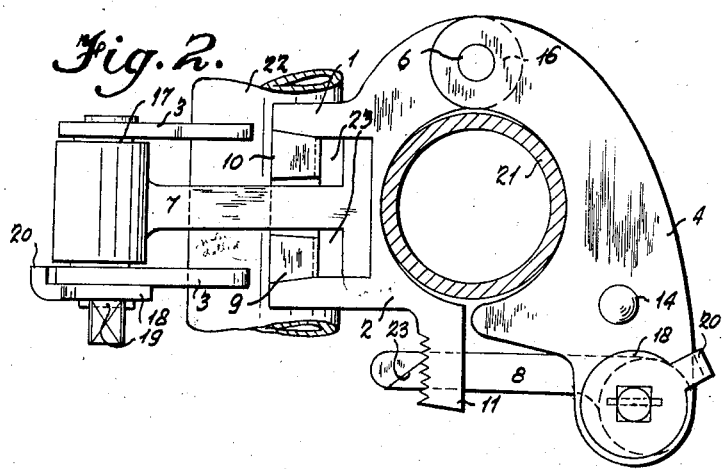

United States Patent Office 2,853,324
Patented Sept. 23, 1958

2,853,324

MEANS FOR CONNECTING TUBES, FOR INSTANCE SCAFFOLDING TUBES

Wilhelm Neidmann, Bielefeld, Germany, assignor to P. Spreeuwenberg's Aannemingsbedrijf N. V., Hoogvliet-Rotterdam, Netherlands, a corporation of the Netherlands Application December 8, 1955, Serial No. 551,758

Claims priority, application Germany February 9, 1955

2 Claims. (Cl. 287—54)

This invention relates to a means for connecting tubes, in particular for scaffolding tubes, comprising two sockets lying at right angles to one another, each of which consists of a rigid socket half and of a socket half hinged to it, each socket having locking and tightening means consisting of a tightening lever which is pivoted, for instance, at a free end of the pivotal socket half so as to turn about a rotatable eccentric pin and which is adapted to be brought into engagement with the other socket half.

This invention has for its object to render the force with which the tubes are clamped in the coupling or clamping means adjustable so that consequently tubes of different diameters or deviations in the diameters may nevertheless be firmly clamped.

According to the invention this result is obtained in that on the rigid socket halves extensions with notches or teeth are provided and that the outer freely extending end of each of the tightening levers has substantially wedge-shaped teeth or noses which are adapted to engage with the notches or teeth of the extensions.

Further features and advantages of the coupling or clamping means according to the invention will be explained below with reference to the accompanying drawings showing by way of example two embodiments of the coupling means according to the invention.

Fig. 1 shows this coupling means in side-elevation.

Fig. 2 is a top plan view of Fig. 1.

Fig. 3 shows a tightening lever partly in side elevation and partly in section.

The coupling means for scaffolding tubes shown in the drawing consists substantially of four socket halves which in the drawing bear the reference numerals 1, 2, 3 and 4, joints 5 and 6, tightening levers 7 and 8 and toothed pairs of extensions 9, 10 and 11, 12.

The sockets are arranged at right angles and off-set with respect to one another. Whilst the two halves of the sockets 1 and 2, which are rigidly connected with one another, preferably consist of a common cast body with widened bearing surfaces, the socket halves 3, 3 and 4, 4 are formed of shaped plates extending parallel to one another which are in each case joined in pairs by means of pins 5, 6, 13 and 14 to form a rigid unit, the afore-said pins 5 and 6 acting at the same time as hinged pins which are supported in corresponding eyes 15, 16 provided on the casting 1, 2.

Besides bearing eyes the casting has also the projections 9, 10, 11 and 12 which are provided with teeth for effecting a better regulation of the tightening force of the coupling.

Each pair of projections 9, 10 and 11, 12 respectively acts in consequence of a space provided between the individual projections in a fork-like manner such that the tightening lever 7 or 8 respectively can be swung inwards or outwards between them.

At the free end of the socket halves made rockable the tightening mechanism for the locking device is housed. This locking device consists of an eccentric pin 17 provided at one side extension 18 with a square cross section. The pin 17 is rotatably supported at the forward end of the socket halves and only that portion of it which lies between the shaped plates is made eccentric.

The tightening lever which establishes the connection between the socket halves has, for enabling differences in the diameter of the scaffolding tubes 21, 22 to be compensated or for enabling a stronger tightening to be applied, at its free end a somewhat T-shaped form provided with two wedge-shaped teeth 23 with which it is in engagement with the teeth of the pairs of extensions 9, 10 and 11, 12 respectively provided on the rigid socket halves.

The eccentric pin 17 supported between the shaped plates may be secured in any suitable manner against any undesired disengagement with the socket halves.

In the drawings its end remote from the square end is enlarged beyond the shaped plate in the form of a rivet head whilst in the region of the square cross-section a washer 18 is slipped over it which is held in position by a pin 19 arranged transversely of the eccentric pin.

The washer 18 provided with a square hole has a stop 20 bent over an angle for limiting the eccentric motion or the motion of the spanner which is employed and which is not illustrated in the drawing.

The mode of operation of the coupling means described above is as follows:

It is assumed that the socket half shown to the right in the drawing has already been fixed to a vertically extending tube 21. The tube 22 which is to be placed in position at right angles thereto is thereupon placed in the left hand socket 1, whereupon the rockable socket half 3 is hinged upwards and the tightening lever 7 is hooked behind the pair of extensions 9, 10.

By means of a preferably long-handled spanner to be placed on the square of the eccentric pin 17 the latter is turned until the safety stop 20 bears against the shaped plate and the eccentric pin assumes the position shown in the drawing.

In the locked position the tightening lever has thus already passed its state of greatest tension in the outer dead position of the eccentric so that in the locking position the safety stop 20 is forced firmly against one of the shaped plates. Consequently any automatic opening of the lock is impossible.

I claim:

1. A scaffolding clamp comprising two socket members disposed at right angles to one another, each of which consists of two cooperating socket halves, one socket half of one socket member being integral with one socket half of the other socket member, each of said integral socket halves being provided with a complementary socket half hinged to one of its ends, the free end of said complementary socket half being provided with an eccentric pin rotatably mounted therein parallel to the hinge axis thereof, and a tightening link rotatably engaged at one end on said eccentric pin, the free end of said link comprising outwardly extending transverse wedge elements whose surfaces converge toward said one end of said link, the integral socket halves being formed with outwardly projecting lugs spaced to receive the link therebetween and being formed with transverse teeth spaced to receive the wedge elements therebetween.

2. The structure of claim 1, and wherein one end of each eccentric pin has a non-circular cross-section, a disc formed with a non-circular aperture fitting said last-named one end, and a transverse stop lug on the disc located to engage with a portion of said complementary socket half when the eccentric pin is rotated past dead center in the locking position of said eccentric pin.

References Cited in the file of this patent

UNITED STATES PATENTS

| | | |
|---|---|---|
| 1,539,943 | Greve | June 2, 1925 |
| 2,194,883 | Burton | Mar. 26, 1940 |

FOREIGN PATENTS

| | | |
|---|---|---|
| 1,099,331 | France | Sept. 2, 1955 |